United States Patent [19]

Sabo

[11] Patent Number: 5,645,449

[45] Date of Patent: Jul. 8, 1997

[54] LOW PROFILE MIXED MEDIA INFORMATION OUTLET

[75] Inventor: James Michael Sabo, Middletown, Pa.

[73] Assignee: The Whitaker Corporation, Wilmington, Del.

[21] Appl. No.: 395,393

[22] Filed: Feb. 21, 1995

[51] Int. Cl.[6] ................................................. H01R 13/60
[52] U.S. Cl. ........................ 439/540.1; 439/536
[58] Field of Search ............................ 439/535, 536, 439/540, 638, 465

[56] References Cited

U.S. PATENT DOCUMENTS

| | | |
|---|---|---|
| 4,241,974 | 12/1980 | Hardesty . |
| 4,451,101 | 5/1984 | Davis . |
| 4,477,141 | 10/1984 | Hardesty ............................ 439/535 |
| 4,558,172 | 12/1985 | Zetena ............................. 174/66 |
| 4,669,802 | 6/1987 | Schaeffer ......................... 439/535 |
| 4,721,476 | 1/1988 | Zeliff et al. ..................... 439/142 |
| 4,874,904 | 10/1989 | DeSanti ........................... 174/53 |
| 4,922,056 | 5/1990 | Larsson ......................... 174/65 R |
| 4,950,840 | 8/1990 | Zetena ............................. 174/66 |
| 4,960,317 | 10/1990 | Briggs et al. ................... 350/96.21 |
| 4,976,510 | 12/1990 | Davila et al. .................... 350/96.2 |
| 4,984,982 | 1/1991 | Brownlie et al. ................. 439/131 |
| 4,988,832 | 1/1991 | Shotey ............................. 174/67 |
| 5,119,455 | 6/1992 | Jennings et al. .................... 385/81 |
| 5,122,069 | 6/1992 | Brownlie et al. ................. 439/131 |
| 5,124,506 | 6/1992 | Briggs et al. ..................... 439/536 |
| 5,196,988 | 3/1993 | Horn .............................. 361/362 |
| 5,219,297 | 6/1993 | Stein et al. ....................... 439/188 |
| 5,318,453 | 6/1994 | Hwang ............................. 439/131 |
| 5,362,254 | 11/1994 | Siemon et al. .................... 439/536 |
| 5,484,308 | 1/1996 | Gotz et al. ....................... 439/536 |

FOREIGN PATENT DOCUMENTS

WO89/04561   5/1989   WIPO .

Primary Examiner—Neil Abrams
Assistant Examiner—Brian J. Biggi

[57] ABSTRACT

A low profile information outlet (1), suitable for mounting to a wall or floor, provides for connections to multiple connector styles and media types while maintaining appropriate minimum bend radii. A connectorized fiber optic cable (30) enters the housing (3) via cable entrance (7) and plugs into fiber optic receptacle (13). Fiber optic receptacle (13) snaps into a flange retention member (9). Connectorized copper cable (33) plugs into a recessed connector well (14) at an angle. The receptacles (13,25) and exterior connectors (45, 48) are protected by the low profile housing (3) and the mounting surface (29). All cables (31,33) exit the housing (3) parallel to the mounting surface (29) to dress along the wall or floor.

10 Claims, 10 Drawing Sheets

LOW PROFILE MIXED MEDIA INFORMATION OUTLET

FIELD OF THE INVENTION

This invention relates to outlets and more specifically to low profile information outlets appropriate for electrical connectors and fiber optic connectors using cable with minimum bend radius requirements.

BACKGROUND OF THE INVENTION

As the technology and geographical reach of remote communication expands, there is an increasing affordable access to the communication infrastructure. Existing infrastructure may be standard copper cable, category III, IV, or V copper cable, or fiber optic cable. Access to phone lines, facsimile lines, CATV, and computer networks is typically through one or more wall or floor outlets that house connectors of varying styles. Outlets often reside in populated areas. Outlets may, therefore, be subject to transverse and tensile forces as people trip over cables protruding from the outlets and move furniture and other objects about in daily routine. To maintain the integrity of the data being transmitted over the infrastructure, it is crucial to maintain the integrity of the physical cable and connectors that carry the data. Repair usually requires retermination or replacement of the connector and retermination of the cable. Repair and the associated temporary inaccessibility to the communication infrastructure, is costly. There is a need, therefore, for a rugged outlet capable of housing varying styles of connectors and cables that is resistant to forces that may occur in the workplace.

Category V copper and fiber optic cables offer higher data transmission speeds and bandwidth than the standard category III copper cable that currently predominates. Category V copper cable and fiber optic cable require a minimum bend radius according to respective engineering codes in order to achieve the available data transmission speeds with acceptable bit error rates. Recommended standards EIA/TIA-568, EIA/TIA TSB-36 and EIA/TIA TSB-40, the contents of which are hereby incorporated by reference, specify transmission performance requirements for unshielded twisted pair (UTP) and fiber optic connecting hardware consistent with the three categories of UTP cable and fiber cable. Shielded twisted pair (STP) cable also has minimum bend radius requirements.

One important specification for UTP cable management practices is that cable bend radii shall not be less than four times the cable diameter. The minimum bend radius currently recommended for fiber optic cable is 30 mm(1.18 inch). A cable that exits a wall or floor at substantially 90 degrees gives rise to the possibility of exceeding the minimum bend radius requirement as gravity acts on the cable. Solutions to this problem include strain relief boots and curved stiffeners to direct a cable downwardly while maintaining the required minimum bend radius. An alternative solution consists of mounting a connector at substantially 45 degrees relative to the mounting surface as disclosed and taught in U.S. Pat. No. 5,362,254. Both the 90 degree exit and the 45 degree exit create a loop comprising a stiff connector body, a strain relief boot and cable that extends from the outlet mounting surface at some angle, into the physical space some distance from the wall, and to the floor. The greater the distance from the mounting surface invaded by the loop, the greater the possibility of snagging the loop injuring either a person or the connector and cable. As furniture is pushed against a wall outlet, the loop also presents the possibility of pushing a desk or chair too close to the point of exit and exceeding the minimum bend radius. In addition, prior art wall outlets have exposed connectors protruding from an outlet mounting surface into the workspace the outlet services. The greater the protrusion from a planar mounting surface, either wall or floor, the greater the possibility the connector will be subject to transverse forces that can damage the connector. There is a need, therefore, for a low profile wall/floor outlet capable of managing cable by maintaining a minimum bend radius.

As technology progresses and the cost of emerging technologies declines, the communication infrastructure will be upgraded to address the increasing demand for capacity, bandwidth, and transmission speeds. Upgrades will include providing additional cable and connection points, replacing existing standard copper cable and the associated connectors with higher grades of cable, including category V copper and fiber optic cable. One using the communication infrastructure will have a variety of transmission media from which to choose and access. There is a need, therefore, for an information outlet that can accommodate a variety of transmission media and connector styles at one time. An outlet that accommodates a current mix of cable and connector styles will most likely require modification at a later time to accommodate newer cable and connector styles installed after initial installation of the outlet. A retrofitable information outlet should, therefore, be able to accommodate the largest minimum bend radius for all connection points in the event of upgrade to full capacity of higher transmission speed cable. It is desirable, therefore, for a hybrid information outlet to be retrofitable and capable of maintaining for all cables a minimum bend radius consistent with the highest grade cable the information outlet can accept.

SUMMARY OF THE INVENTION

It is an object of the present invention that an information outlet be compact and capable of accommodating varying connector styles while maintaining a minimum bend radius of the cables therewithin.

It is a further object of the present invention that an information outlet be unobtrusive and low profile while achieving a high connection density.

It is a further object of the present invention that an information outlet be rugged and capable of protecting the integrity of the cable and connectors housed therewithin.

It is a further object of the present invention that an information outlet be retrofitable with varying connector styles.

According to an aspect of the invention, a low profile information outlet suitable for attachment to a mounting surface comprises a housing having first and second opposite sides. A surface plate of the housing has a cable entrance disposed substantially adjacent the first side and a receptacle retention member is disposed on said second side.

According to another aspect of the invention, a low profile information outlet suitable for attachment to a mounting surface comprises a housing comprising a surface plate and first and second opposite sides. A cable exit guide is on the first side. A connector well is recessed from the surface plate and is rearward of the mounting surface. The connector well has an attachment plate comprising a frame with a plurality of openings latchably receiving modular receptacles. The attachment plate is oriented between 75 degrees and 25 degrees with respect to the surface plate.

According to another aspect of the invention a low profile information outlet suitable for attachment to a mounting surface comprises a housing comprising a hinged side and a surface plate with a cable entrance disposed substantially adjacent the hinged side. A cover hingeably engages the housing on the hinged side. The cover has a first side opposite said hinged side with a receptacle retention member disposed thereon.

It is a feature of the present invention that the cable entrance is disposed on the surface plate substantially adjacent a second side of the housing and a flange retention member is disposed on a first side of the housing.

It is a feature of the present invention that all cables exit the housing and dress along a plane close to and parallel to an outlet mounting surface.

It is an advantage of the present invention that a wall outlet is low profile and unobtrusive.

It is an advantage of the present invention that all cables within the housing maintain a minimum bend radius promoting data integrity.

It is an advantage of the present invention that cables exiting the outlet by dressing parallel to the mounting surface limit the possibility that transverse and tensile forces will be applied to exiting cables due to movement of people and furniture during customary office routine.

It is an advantage of the present invention that varying connector styles may be accommodated and retrofitted.

DETAILED DESCRIPTION OF THE PREFERRED EMBODIMENTS

Figure 1:
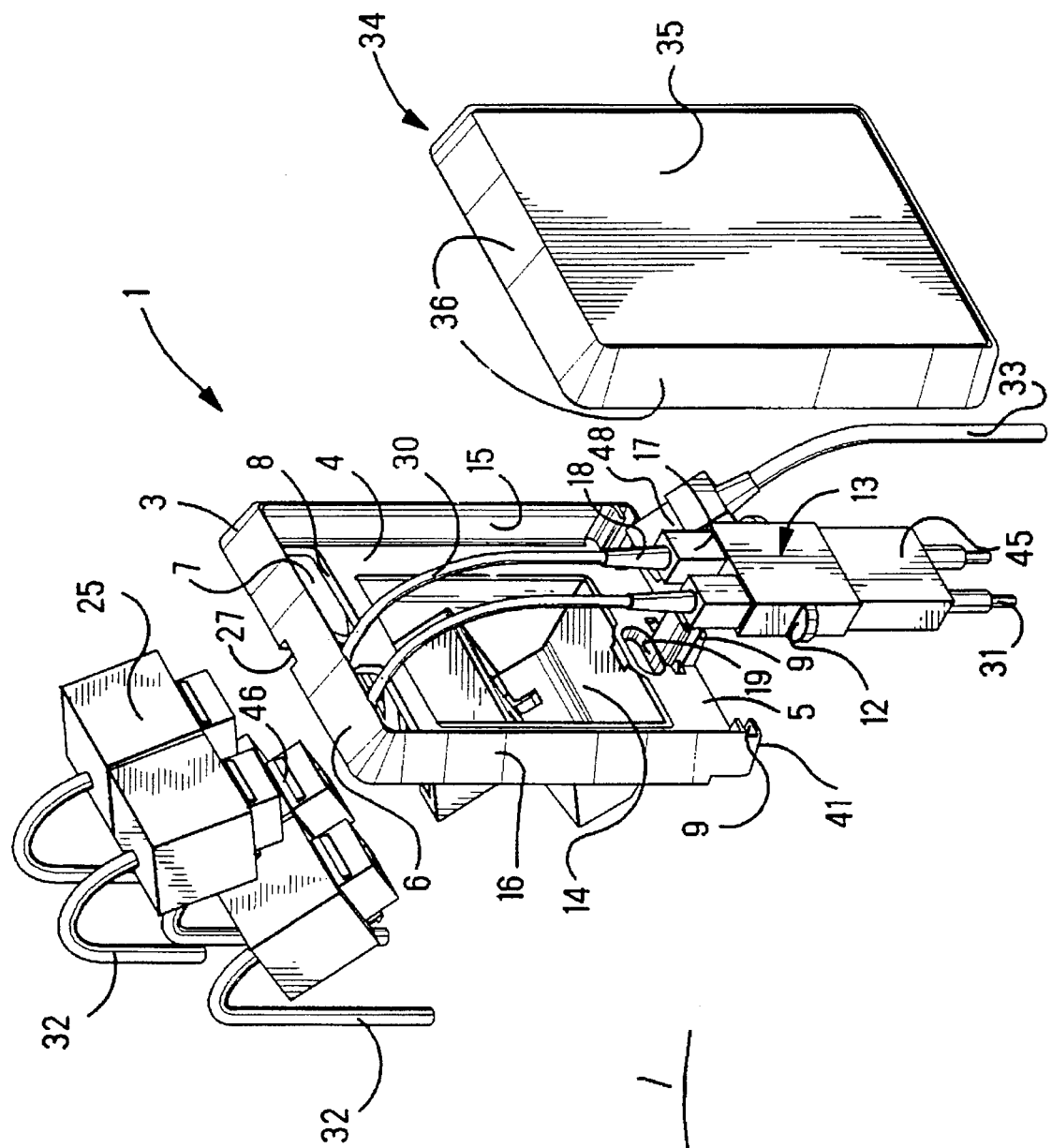
FIG. 1 is an exploded perspective view of an information outlet according to the teachings of the present invention.

An outlet 1 comprises a housing 3 used in conjunction with a junction box 2 in a preferred application. The junction box 2 is a conventional double gang junction box typically mounted in a recess in a mounting surface 29, either a wall or floor. The junction box 2 may be mounted directly to a solid wall such as cinder block or on a pole, where a recess into the mounting surface is infeasible. The junction box 2 receives cable through conventional means by way of a conduit into a side of the junction box 2. Alternatively, one may dispense entirely with the junction box 2 and mount the housing 3 directly to the mounting surface 29 provided there is a cavity rearward of the mounting surface 29. For purposes of this disclosure, rearward refers to a side of the mounting surface 29 directed away from a workspace as shown by arrows in FIG. 4. Also for purposes of this disclosure, a cable and its associated connector originating rearward of the mounting surface 29 is termed an interior cable and connector. A cable and connector for cable directed toward the work space is an exterior cable and connector. According to current industry practice, a certain length of excess interior cable 30,32 provides enough length for convenient servicing of the outlet during installation, maintenance, and repair. A typical service loop for copper cable is 13 to 24 inches and for fiber optic cable is approximately 1 m(39 inch). Applicable standards outline minimum bend radius requirements for category III, IV, and V unshielded twisted pair copper and fiber optic cable installations. The applicable standards are EIA/TIA-568 and for 150 ohm shielded twisted pair (STP-A) in TSB-53, the contents of each standard are hereby incorporated by reference. In the case of category V, the applicable standards for cable management recommend that the minimum cable bend radius not exceed four times the cable diameter. In the case of fiber optic cable, the minimum cable bend radius is 30 mm(1.18 inch). A cluster of interior cables 30,32 entering the junction box 2 is wound about an axis to fit within the confines of the junction box 2. Due to the resiliency of the cable, when the coils are placed within the junction box, the diameter of the coils expand to engage the sides of the junction box 2. The dimensions of a conventional double gang junction box are sufficiently large to maintain the minimum bend radius requirements for the coils in 1 meter of fiber optic cable as limited by the sides of the junction box 2. The preferred minimum dimensions of a junction box 2 are 4 inch width by 4 inch height by 2 inch depth.

Figure 2:
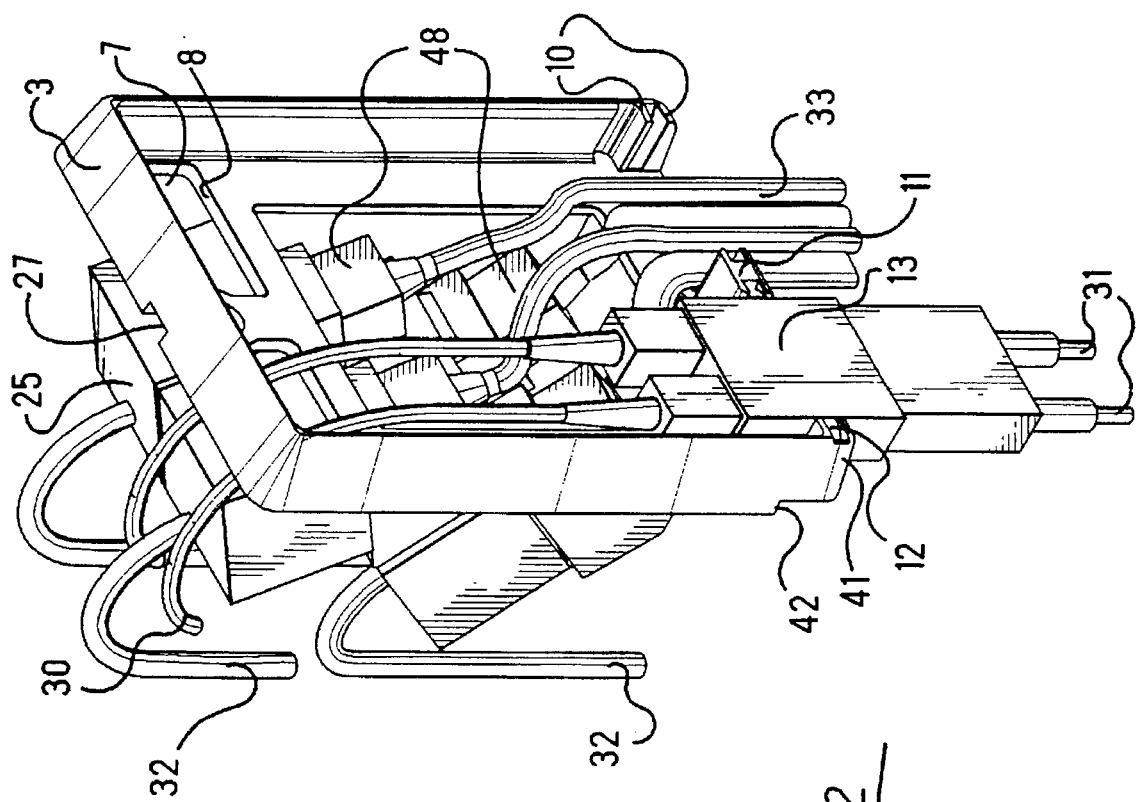
FIG. 2 is an assembled perspective view of an information outlet according to the teachings of the present invention.
Figure 3:
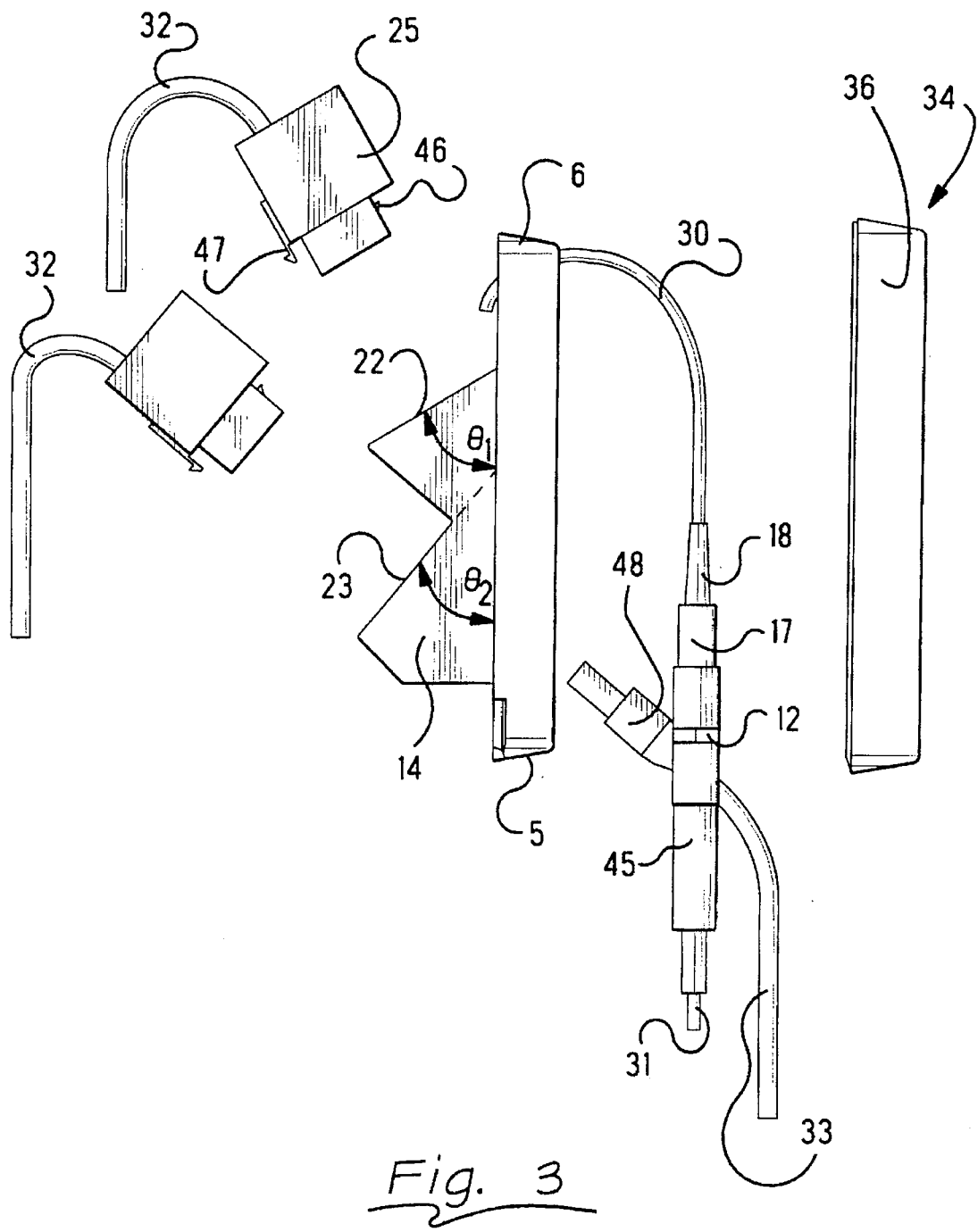
FIG. 3 is a cross sectional view of an information outlet with connectors disassembled to a housing and in relative position prior to assembly according to the teachings of the present invention.
Figure 4:
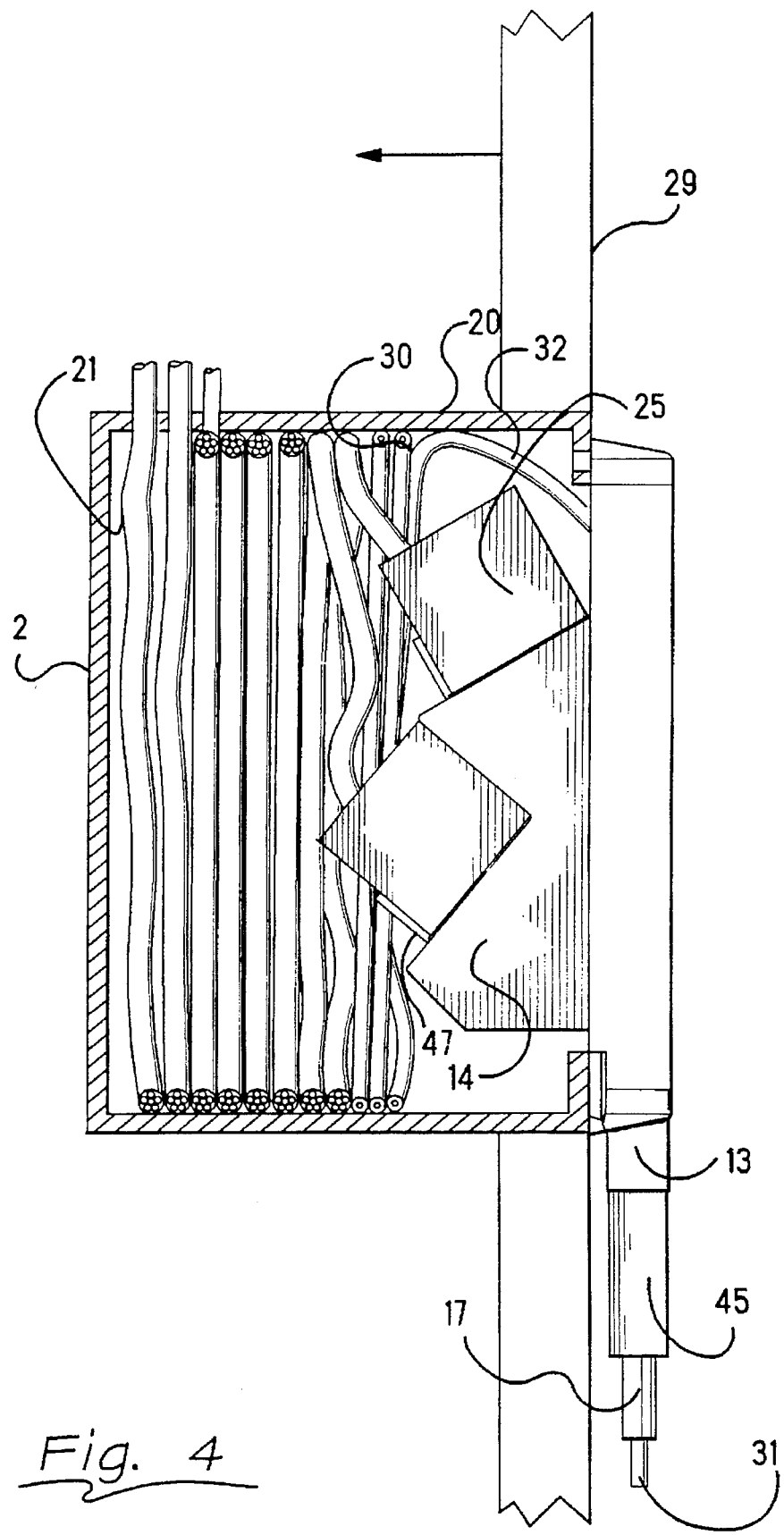
FIG. 4 is an cross sectional view of an information outlet with connectors assembled to a housing and mounted to a mounting surface.
Figure 5:
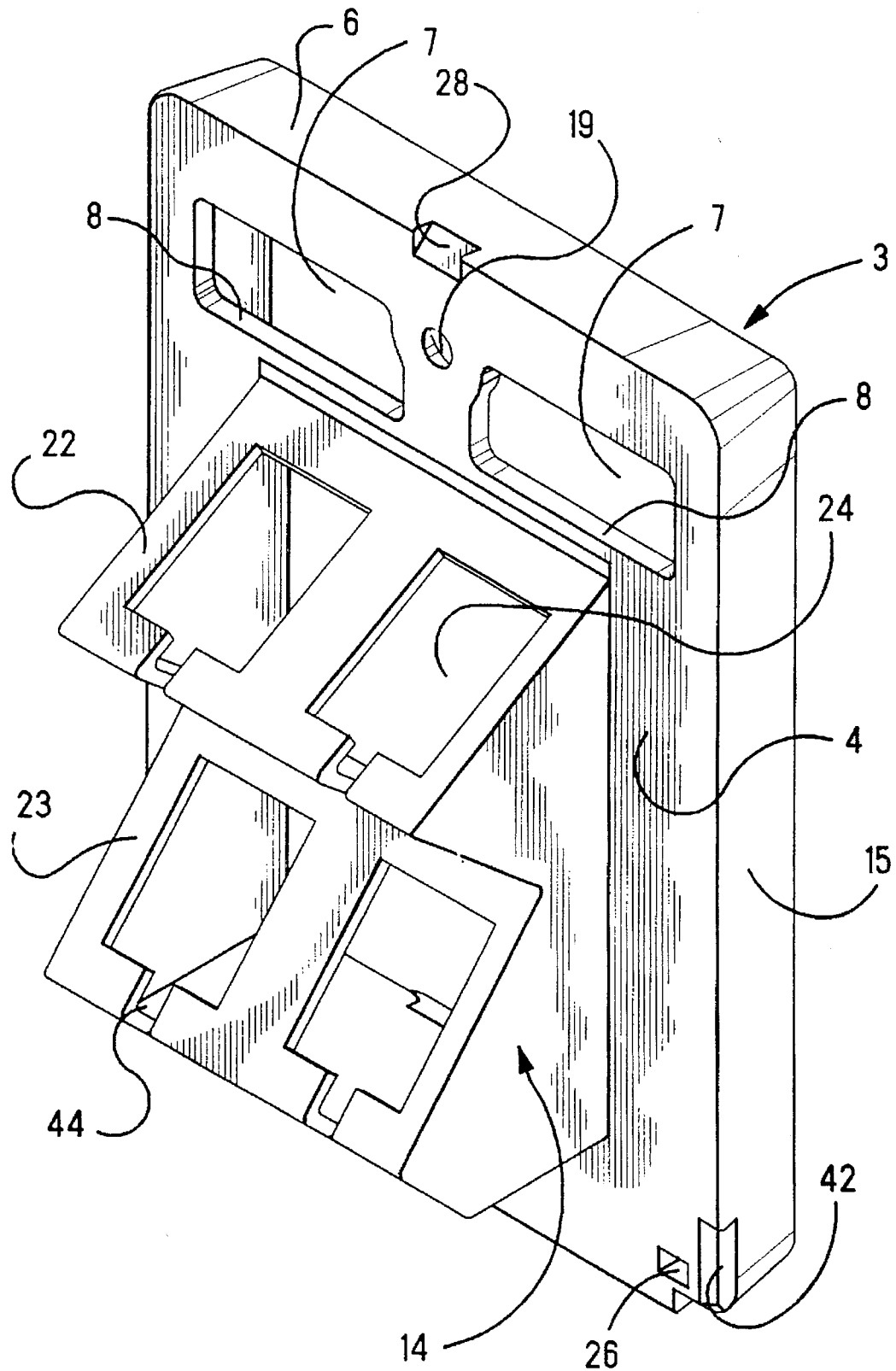
FIG. 5 is a perspective view of an information outlet housing according to the teachings of the present invention as seen looking rearward of a mounting surface toward a workspace.
Figure 6:
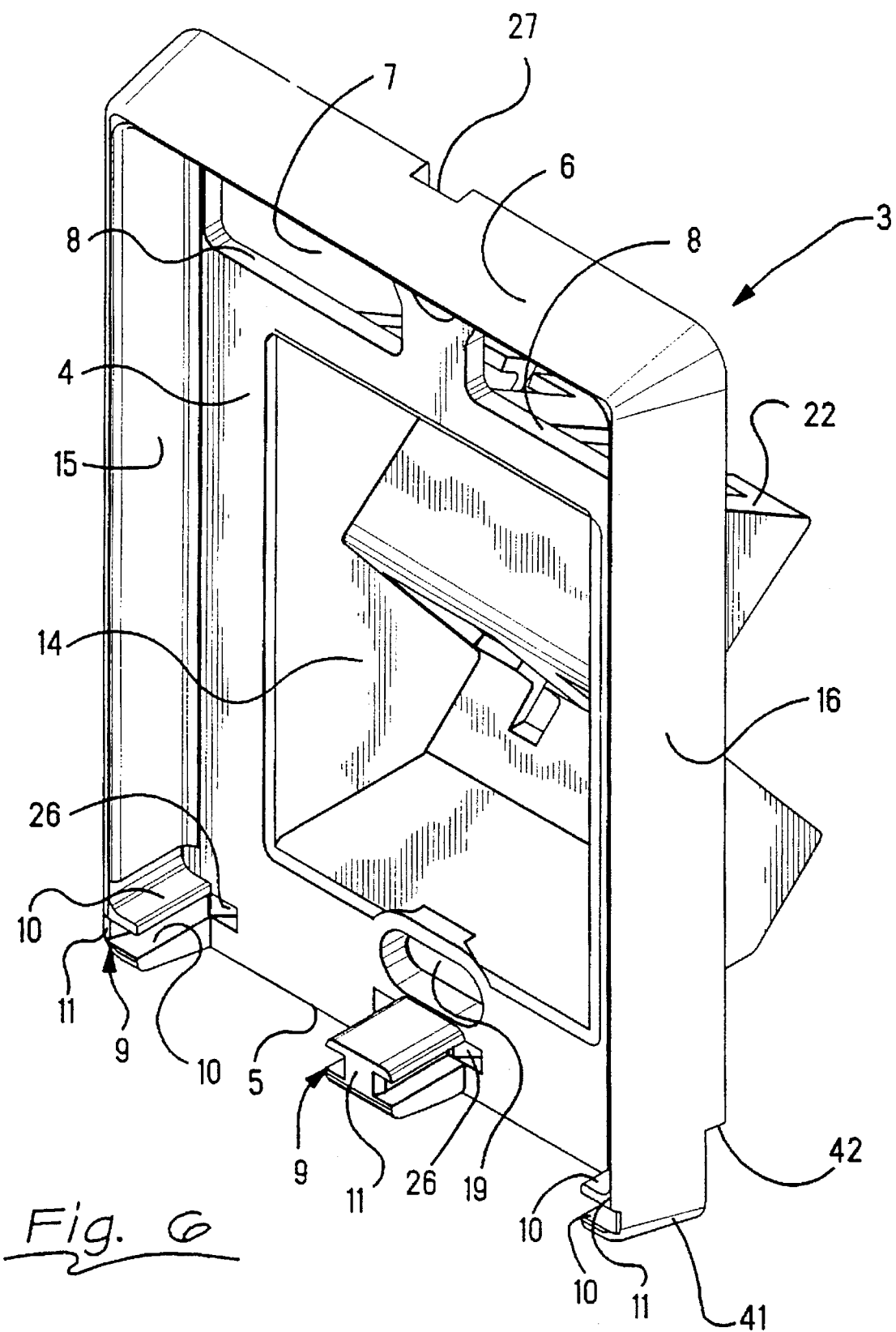
FIG. 6 is a perspective view of an information outlet housing according to the teachings of the present invention as seen looking from a workspace toward a direction of the mounting surface.
Figure 7:
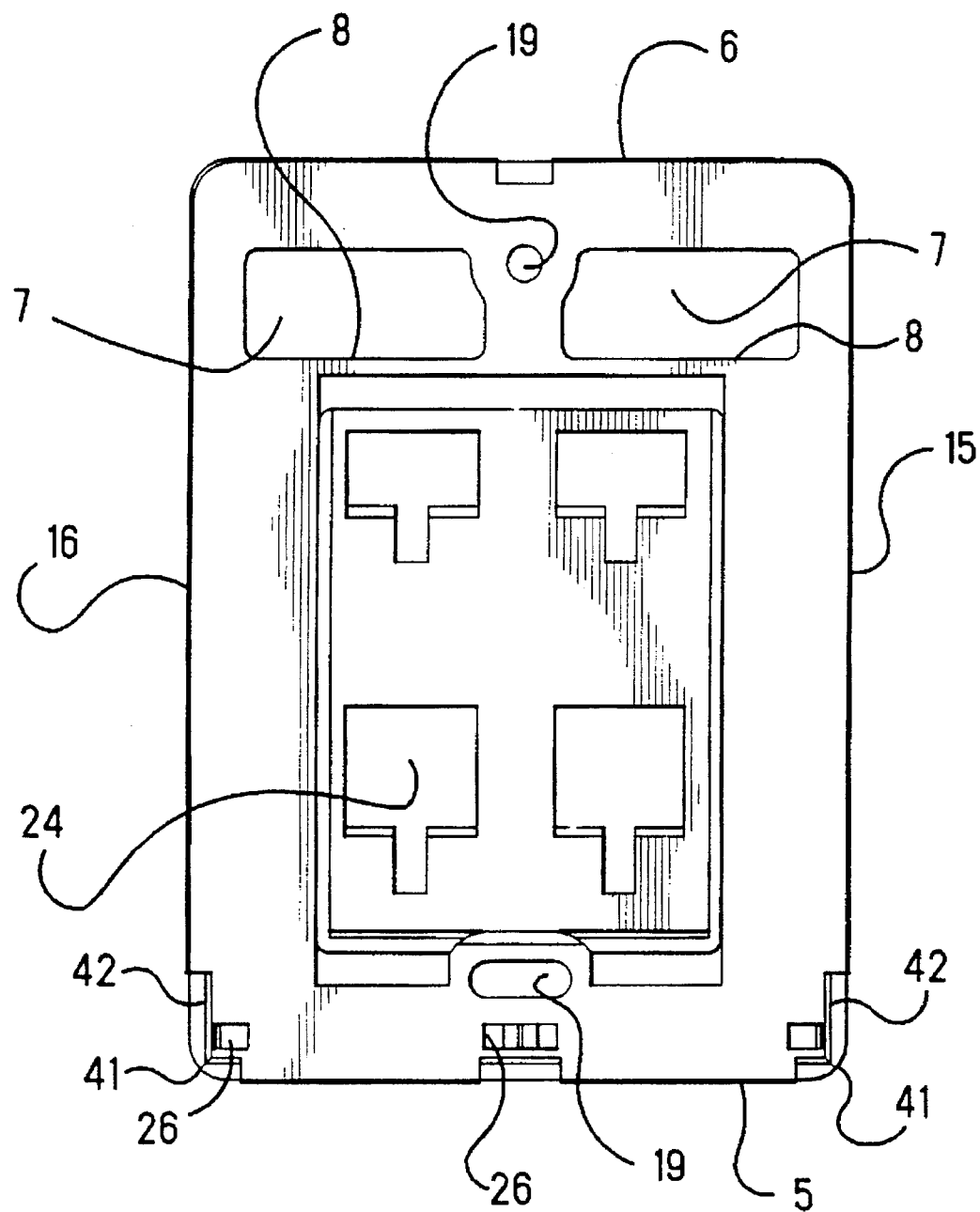
FIG. 7 is a plan view of an information outlet housing according to the teachings of the present invention.
Figure 8:
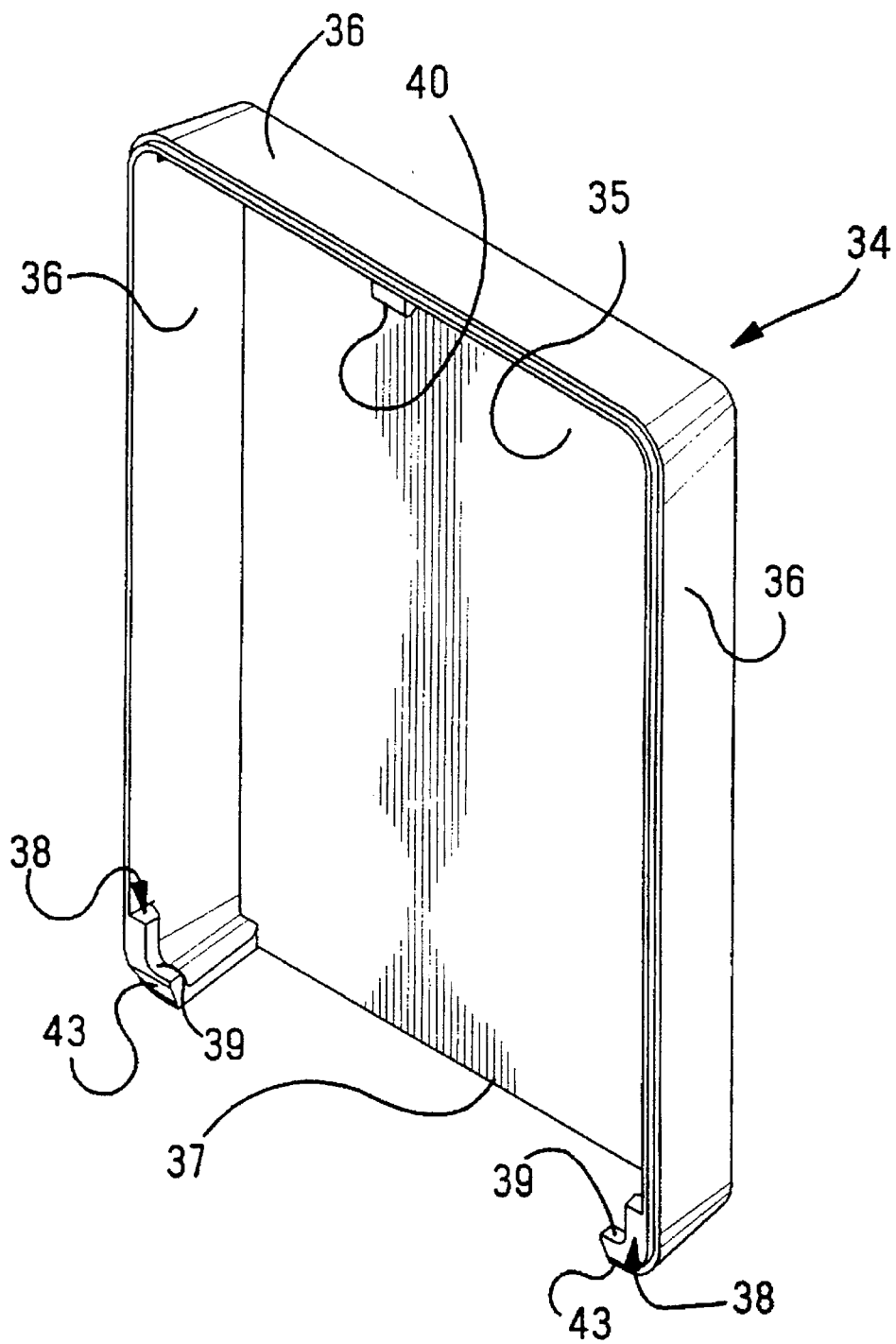
FIG. 8 is a perspective view of an information outlet cover plate capable of releasable attachment to a housing according to the teachings of the present invention.

With reference to FIGS. 4, 5 and 6, the housing 3 comprises a surface plate 4 having first and second opposite sides 5,6. Two cable entrances 7 are adjacent the second end 6 of the surface plate 4. An interior fiber optic cable 30 exits the junction box 2 and enters the housing 3 through the cable entrances 7. A lower edge 8 of the cable entrance 7 is below an upper end 20 of the junction box 2. There are two receptacle retention members which are, in a preferred embodiment, flange retention members 9 substantially perpendicular to the surface plate 4 and on the first side 5. Each flange retention member 9 comprises two sets of interference plates 10 substantially perpendicular to the surface plate 4 and parallel to each other. The interference plates 10 are separated from each other a distance equal to a flange 12 on a duplex fiber optic receptacle 13 (as shown in FIG. 1). The preferred fiber optic receptacle depends upon a particular application and may, with equally beneficial results, be either a duplex SC style to SC style receptacle or a duplex ST style to SC style receptacle. It is preferred that the SC style connector be the exterior connector. Alternatively, a duplex ST style to duplex ST style fiber optic receptacle may also be used. "ST" is a registered trademark of AT&T referring to a bayonet style fiber optic connector having a straight tip ferrule. The interference plates 10 are connected to each other via a stiffener 11 perpendicular to the interference plates 10 and the surface plate 4. Third and fourth sides 15,16 of the housing 3 are substantially perpendicular to the surface plate 4 and the first and second sides 5,6 and are parallel to each other. With reference to FIG. 1, the flange 12 of the fiber optic receptacle 13 is perpendicular to the fiber that passes through it. In a mated condition, the fiber optic receptacle 13 receives fiber optic connectors 17,45 from either side. A connectorized interior fiber optic cable 30 exits the junction box 2, enters the housing 3, and plugs into the fiber optic receptacle 13. The flange 12 of the fiber optic receptacle 13 snap fits into the flange retention members 9. All of the preferred fiber optic receptacles mentioned herein are interchangeable providing for easy retrofitability as connector styles for the fiber optic cables 30,31 are modified. The lower edge 8 of the cable entrance 7 is a sufficient distance from the flange retention member 9 to accommodate a strain relief boot 18 on the interior fiber optic cable 30 and associated interior fiber optic connector 17. When the fiber optic receptacle 13 is mounted into the flange retention members 9, and the fiber optic receptacle 13 has an interior fiber optic connector 17 plugged therein, the interior fiber optic cable 30 dresses along and parallel to the surface plate 4 for the length of the strain relief boot 18. As the interior fiber optic cable 30 emerges from the strain relief boot 18, it is permitted to gradually bend toward the lower edge 8 of the cable entrance 7 and pass through the cable entrance 7 in the surface plate 4 over a 90 degree arc as shown in FIG. 2. The interior fiber optic cable 30 engages an upper side 20 of the junction box 2. Remaining sides 21 of the junction box 2 limit the maximum diameter of a coiled interior fiber optic cable 30 which is greater than the minimum bend radius for fiber optic cable. Resiliency of the coiled interior fiber optic cable 30 causes the diameter of the coil to expand until the cable is otherwise limited by the sides of the junction box 2. The lower edge 8 of the cable entrance 7 is positioned a sufficient distance from the flange retention member 9 to permit the strain relief boot of the interior fiber optic cable 30 to dress along the planar surface plate 4 and to provide for a sufficiently gradual transition over a 90 degree arc into the junction box 2 to maintain a minimum bend radius for the interior fiber optic cable 30.

With reference to FIG. 4, the exterior connectorized fiber optic cable 31 plugs into the opposite side of the fiber optic receptacle 13 in a mated condition. Due to the positioning of the flange retention members 9 and the flange 12 of the fiber optic connector receptacle 13, the exterior fiber optic connector 45 plugs to the fiber optic receptacle 13 parallel to the mounting surface 29. In a preferred application of the present invention, the junction box 2 is mounted in a recess in the mounting surface 29. Only the sides 5,6,15,16 of the housing 3 protrude from the mounting surface 29 into the workspace. The width of the first side 5 of the housing 3 is substantially equivalent to the exterior depth of the fiber optic receptacle 13. The exterior fiber optic connector 45 plugs in perpendicular to the first side 5 of the housing 3. Due to the equivalence between the width of the first side 5 of the housing 3 and the depth of the fiber optic receptacle 13, the exterior fiber optic connector 45 advantageously dresses close to and parallel to the mounting surface 29. The relative placement of the exterior fiber optic connector 45 and the mounting surface 29 permits the mounting surface 29 to act as a strain relief for the portion of the exterior fiber optic connector that is external to the housing 3. In the event that furniture or other heavy items are positioned directly against the exterior connector 45, the mounting surface 29 acting as a strain relief can prevent damage to the exterior connector 45 that might otherwise occur in the absence of strain relief. Additionally, the exterior cable 31 exits the exterior connector 45 and dresses directly along the mounting surface 29 eliminating a loop of cable that could be "snagged" or tripped over during the course of normal office routine.

The housing 3 further comprises a connector well 14. The connector well 14 is recessed from the housing 3 into the space delimited by the sides 20, 21 of the junction box 2 or recess rearward of mounting surface 29. The connector well 14 has top and bottom attachment plates 22, 23 respectively. Each attachment plate 22,23 is a frame with two openings 24 to receive modular receptacles 25. The modular receptacles 25 are conventional in the industry and are available from AMP Incorporated under the name of 110Connect System Jacks. Dimensions of the openings 24 are approximately 0.790 inch height by 0.582 inch width. The modular receptacles 25 are latchably received by the openings 24 in the frame of the attachment plates 22,23. A barb 46 and cantilever latch 47 configuration effects the latchable receipt of the modular receptacles 25. By virtue of the fact that the modular receptacles 25 are latchably received, the connector well 14 is configurable and retrofitable with modular receptacles appropriately sized and configured to be received in the openings 24. Release slots 44 extend from openings 24 in the attachment plates 22,23. The release slots 44 permit insertion of a tool such as an appropriately sized screwdriver to urge the cantilever latch 47 toward the modular receptacle 25. As the cantilever latch 47 clears the edges of the openings 24, the modular jack may be removed from the housing 3. An interior copper cable 32 connects to one side of the modular jack 25 in the attachment plate 22,23. As the connector well 14 is recessed into the junction box 2, the interior copper cable 32 is protected by the junction box 2 and/or the mounting surface 29. The interior copper cable 32 is coiled in a similar fashion as the coil of the interior fiber optic cable 30 and the diameter of the coil of the interior copper cable 32 is similarly limited.

A connectorized exterior copper cable 33 and exterior copper connector 48 plug into the modular receptacle 25 on a workspace side of the housing 3. The top attachment plate 22 is oriented at a preferred angle $\theta_1$ of 60 degrees (acceptable range being plus/minus 15 degrees) from the surface plate 4. A bottom attachment plate 23 is oriented at a preferred angle $\theta_2$ of 40 degrees (acceptable range being plus/minus 15 degrees) from the surface plate 4. The connectorized exterior copper cables 33 plug in perpendicular to the respective attachment plate 22,23. As the connector well 14 and associated attachment plates 22,23 are recessed from the housing 3 and rearward of the mounting surface 29 and/or junction box 2, the exterior copper cables 33 dress out of the modular jack 25 at an angle. As gravity acts, the exterior cables gradually bend in the housing 3 so that the exterior copper cable 33 is parallel to the mounting surface 29 at the point it exits the housing 3. The flange retention members 9 act as a cable exit guide for the exterior copper cable 33 if a fiber optic receptacle is not installed. Anchoring holes 26 in the surface plate 4 are between the interference plates 10 on either side of the flange retention members 9. Conventional cable tie backs (not shown) may be threaded through the anchoring holes 26 to secure exterior copper cables 33 against the surface plate 4 of the housing 3 assuring their exit from the housing at 180 degrees relative to the mounting surface 29. The 180 degree exit of the exterior copper cable 33 from the first end 5 of the housing 3 provides the same advantages of dressing along the mounting surface 29, a wall for example, as articulated for exterior fiber optic cable 31 hereinabove. The exterior copper cables 33 first dress internal to the housing prior to exiting the housing 3. The modular receptacles 25, the exterior copper connectors 48 and the bend of the exterior copper cables 33 are protected by being internal to the low profile housing 3. The protection provided by having connectors 48 internal to the housing 3 ruggedizes the outlet making it more advantageous for premise wiring and worksite applications. The housing 3 is preferably molded as a unitary piece out of polybutylene terephthalate.

Installation of the housing 3 comprises installing the junction box 2 (if used), terminating the interior copper cables 32 to the modular receptacles 25, and terminating the interior fiber optic cables 30 to the interior fiber optic connectors 17 as is conventional in the industry. Snapping the modular receptacles 25 into the openings 24 in the attachment plates 22,23 and threading the interior fiber optic connector 17 and cable 30 through the cable entrances 7. Mounting the housing 3 to the junction box 2 or directly to the mounting surface 29 through screw holes 19 or other appropriate mounting means. Plugging mating exterior copper connectors and cable 33 into the modular receptacles 25. Securing the exterior copper cables 33 to the surface plate 4 with tie backs. Connecting the fiber optic receptacle 13 and mating exterior fiber optic cables 31 to the interior fiber optic cables 30. Snapping the fiber optic receptacle 13 into the flange retention members 9. A cover 34 may or may not be used.

Figure 9:
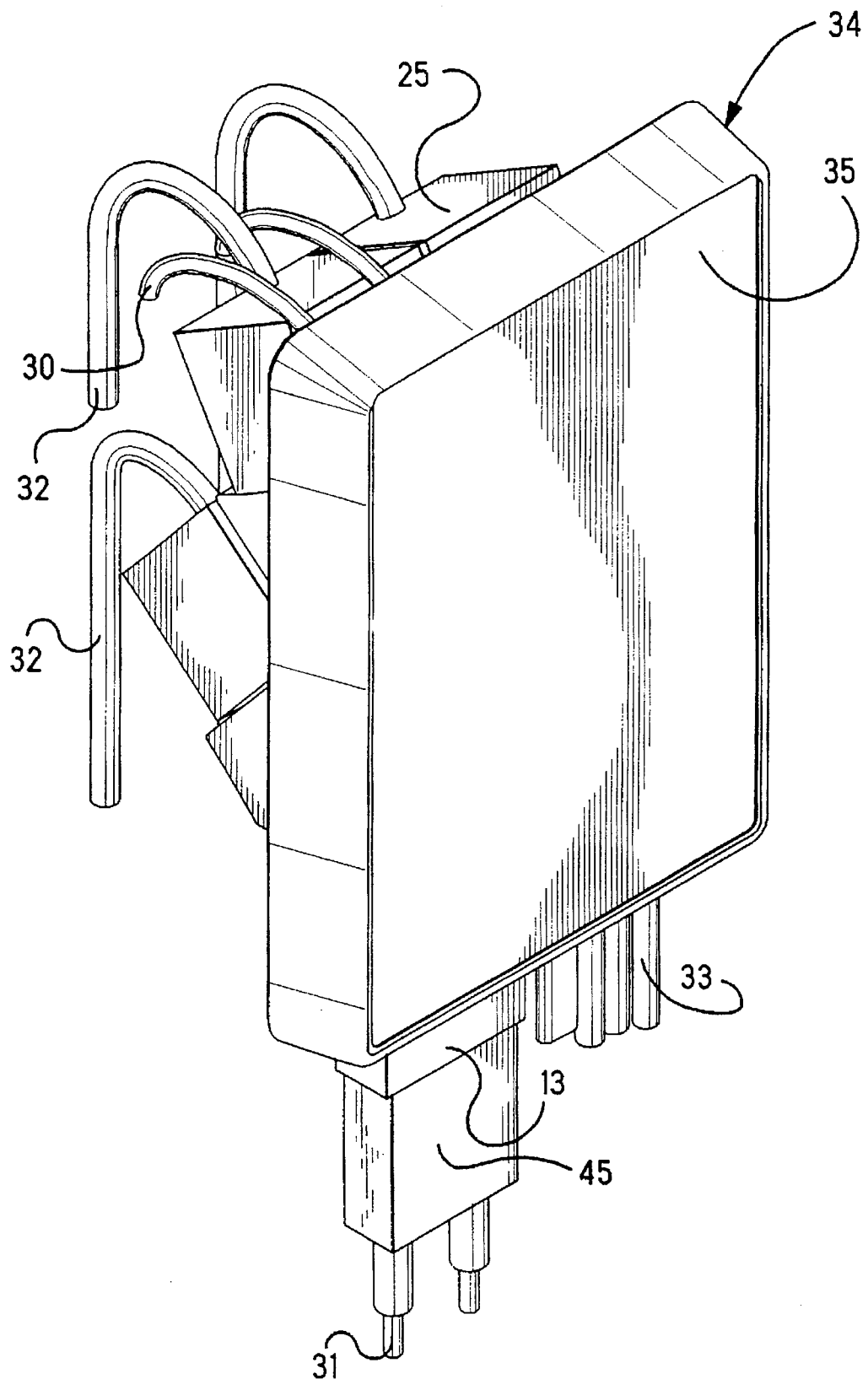
FIG. 9 is a perspective view of an assembled information outlet with a cover installed according to the teachings of the present invention.

With specific reference to FIGS. 1, 5, 6, and 8 a cover 34 comprises a cover plate 35 enclosed by three minor sides 36 and is open on a fourth minor side 37. The three minor sides are angled approximately 10 degrees off the angle that is perpendicular to the cover plate 35. All sides 6, 15, 16 of the housing 3 are similarly angled approximately 10 degrees off the angle that is perpendicular to the surface plate 4 and the mounting surface 29. The fourth minor side 37 of the cover 34 has dual edge latches 38 on opposite ends. Each edge latch 38 comprises a shoulder created by partially enclosing the cover plate 35 and two minor sides on a side parallel to the cover plate and offset from the cover plate 35 a distance approximately equal to the width of the minor side 36, thereby connecting one minor side to the open fourth minor side 37 in the approximate shape of an "L". An edge latch cam surface 39 is parallel to the respective minor sides 36. The edge latch cam surface 39 is, therefore, angled at approximately 10 degrees off of a line perpendicular to the cover plate 35. The minor side 36 opposite the open side 37 has a top cover latch 40 central and perpendicular to the minor side to which it is attached. The top cover latch 40 is oriented parallel to and away from the cover plate 35 a distance approximately equal to the width of the minor side 36. The housing 3 has a latch recess 27 on a second side 6 of the housing 3. The latch recess 27 comprises a central cutout at the junction of the surface plate 4 and the second side 6 of the housing 3. The latch recess 27 is sized and oriented to receive the top cover latch 40. The cover is preferably molded of polyphenylene ether. In certain hospital applications, however, the cover is preferably stamped and formed out of stainless steel. The cover 34 presents the flat planar surface of the cover plate 35 to the workspace as shown in FIG. 9. The cover 34 provides protection from dust, moisture, and damaging forces for the connectors and cables internal to the housing 3. The smooth surface of the cover plate 35 advantageously permits adaptation of the cover plate to aesthetically coordinate with the decor of the workspace and provides a convenient means to clean the outlet 1 as necessary. A label may be affixed to the non-workspace side of the cover plate 35 to provide information according to any desired convention concerning the type, source, and destination of the cables connected to the outlet 1.

Subsequent to installation of the outlet 1, installation of the cover 34 comprises orienting the cover 34 at an angle relative to the mounting surface 29 so that the open fourth minor side 37 is angled away from the mounting surface 29 and positioning the top cover latch 40 to be received by the latch recess 27. When the top cover latch 40 is received, the open fourth minor side 37 of the cover 34 is brought toward the housing 3. The edge latches 38 engage lower corners 41 of the housing 3. The edge latch cam surfaces 39 urge minor sides 36 of the cover 34 to flex outwardly as the cover 34 is pressed closer to the housing 3. As the minor sides 36 flex, the edge latches 38 clear the lower corners to bring the cover 34 closer to the mounting surface 29. The housing 3 has dual undercuts 42 on the lower corners 41 of the housing 3. As the edge latches 38 clear the undercuts 42, the minor sides 36 of the cover 34 and the edge latches 38 retract to their unflexed position retainably engaging the housing 3. The latch recess 27 has a latch recess cam surface 28 at a 45 degree angle relative to the surface plate 4. The latch recess cam surface 28 permits tool-less manual removal of the cover 34 once installed. The top minor side 36 of the cover 34 is urged away from the mounting surface 29. The top cover latch 40 engages the latch recess cam surface 28 causing the top cover latch 40 to flex away from the cover plate 35. As the top cover latch 40 flexes, it clears the first side 5 of the housing 3. Rocker surfaces 43 on each edge latch 38 permits the top of cover 34 to be angled away from the first side 5 of the housing 3 while edge latches 38 remain in engagement with the undercuts 42 on the lower corners 41 of the housing 3. With the second side 6 cleared, removal of the cover 34 is completed by bringing the cover 34 down parallel to the mounting surface 29 to clear the edge latches 38. A label may be placed on an inside surface of the cover plate 35 to indicate according to a desired convention the source and/or destination for the interior and/or exterior cables connected to the outlet 1. Although the 180 degree exit reduces the possibility of "snagging" a loop of exterior cable, if one were to trip over an exterior loop of cable, the latchable cover 34 would release in response to the tensile force on the cable before the cables and/or connectors would be destroyed provided that the cables were not secured to the surface plate 4 using cable ties through the anchoring holes 26.

Figure 10:
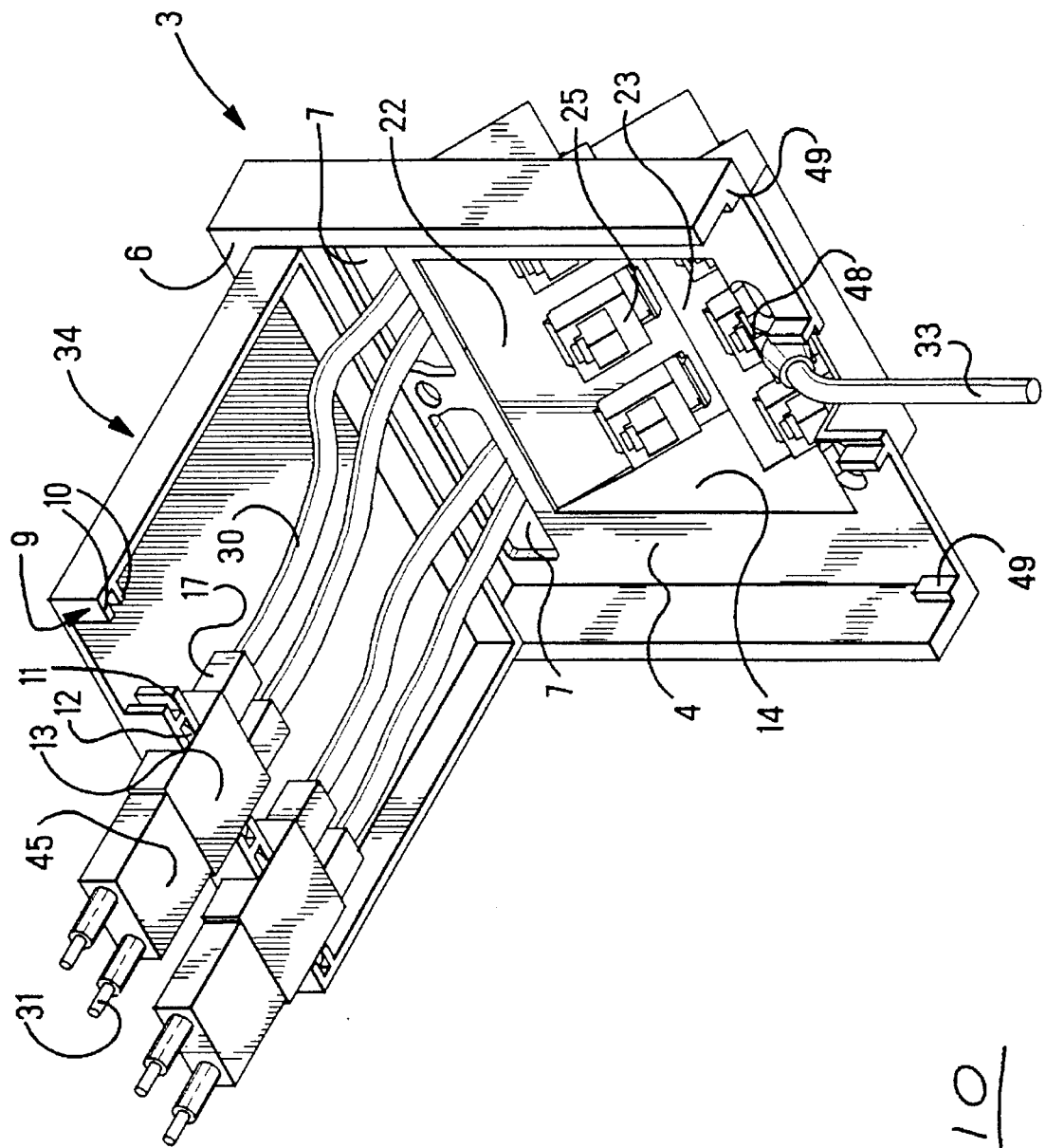
FIG. 10 is a perspective view of an alternative information outlet according to the teachings of the present invention.

With specific reference to FIG. 10, an alternative embodiment comprises a hinged cover 34 as distinct from the latchable cover disclosed hereinabove. FIG. 10 shows a double gang embodiment, but single and other multiple gang embodiments are possible without departing from the scope of the claimed invention. The cover 34 is hinged to the housing 3 on the second side 6 adjacent the cable entrances 7. The flange retention members 9 are positioned on the fourth open side 47 of the cover 34. The flange 12 of fiber optic receptacle 13 snap fits into flange retention members 9. As the hinged cover 34 is angled away from the housing 3, it carries with it the fiber optic receptacle 13 providing unimpaired access to the copper connectors. In the hinged cover embodiment, the protrusion of the housing 3 into the workspace is slightly greater than the latchable cover embodiment. When the hinged cover 34 is closed, standoffs 49 engage the surface of flange retention members 9 providing a clearance between the fiber optic receptacle 13 and the surface plate 4. The clearance may receive exterior copper cables 33 as they exit the housing 3 into the workspace. This provides a slightly denser housing 3 when fully assembled.

These and other aspects of the invention as described herein are intended to be illustrative rather than limiting.

Variations may occur to one of ordinary skill in the art without departing from the spirit and scope of the appended claims.

I claim:

1. A low profile information outlet suitable for attachment to a mounting surface comprising;

a housing having first and second opposite sides, said housing comprising a surface plate with a cable entrance disposed substantially adjacent said first side, a receptacle retention member disposed on said second side, and a connector well recessed from said surface plate and rearward of the mounting surface, said connector well having an attachment plate comprising a frame having a plurality of openings latchably receiving modular receptacles, said attachment plate oriented between 75 and 25 degrees with respect to said surface plate.

2. The information outlet as in claim 1 wherein said housing receives a receptacle in said receptacle retention member wherein said receptacle has a flange and said receptacle retention member comprises a pair of parallel interference plates joined by a stiffener for receiving said flange.

3. The information outlet as in claim 1, further comprising a connector well recessed from said surface plate and rearward of the mounting surface having first and second attachment plates, said first attachment plate oriented between 45 and 75 degrees with respect to said surface plate and said second attachment plate oriented between 25 and 55 degrees with respect to said surface plate.

4. The information outlet as in claim 1 further comprising a cover plate mounted to said housing.

5. A low profile information outlet suitable for attachment to a mounting surface comprising;

a housing comprising;
a surface plate and first and second opposite sides,
a cable exit guide on said first side, and
a connector well recessed from said surface plate rearward of the mounting surface, said connector well having an attachment plate comprising a frame with a plurality of openings latchably receiving modular receptacles, said attachment plate oriented between 75 degrees and 25 degrees with respect to said surface plate.

6. The information outlet as in claim 5 wherein said connector well has first and second attachment plates, said first attachment plate oriented at substantially 60 degrees with respect to said surface plate and said second attachment plate oriented at substantially 40 degrees with respect to said surface plate.

7. A low profile information outlet suitable for attachment to a mounting surface comprising;

a housing comprising a hinged side, and a surface plate with a cable entrance disposed substantially adjacent said hinged side, a cover hingeably engaging said housing on said hinged side, said cover having a first side opposite said hinged side, said cover having a receptacle retention member disposed on said first side.

8. The information outlet as in claim 7 wherein said housing receives a receptacle in said receptacle retention member wherein said receptacle has a flange and said receptacle retention member comprises a pair of parallel interference plates joined by a stiffener for receiving said flange.

9. The information outlet as in claim 7, further comprising a connector well recessed from said surface plate and rearward of the mounting surface having an attachment plate comprising a frame having a plurality of openings latchably receiving modular receptacles, said attachment plate oriented between 25 and 75 degrees with respect to said surface plate.

10. The information outlet as in claim 7, further comprising a connector well recessed from said surface plate and rearward of the mounting surface having first and second attachment plates, said first attachment plate oriented between 45 and 75 degrees with respect to said surface plate and said second attachment plate oriented between 25 and 55 degrees with respect to said surface plate.

* * * * *